United States Patent [19]
Johnson

[11] Patent Number: 5,621,880
[45] Date of Patent: Apr. 15, 1997

[54] METHOD AND APPARATUS FOR PROVIDING CONTEXTUAL NAVIGATION TO HISTORICAL DATA

[75] Inventor: William J. Johnson, Flower Mound, Tex.

[73] Assignee: International Business Machines Corp., Armonk, N.Y.

[21] Appl. No.: 668,090

[22] Filed: May 14, 1996

Related U.S. Application Data

[63] Continuation of Ser. No. 293,361, Aug. 19, 1994, abandoned.

[51] Int. Cl.$^6$ ........................................................ G06F 3/14
[52] U.S. Cl. ............................................. 395/326; 395/340
[58] Field of Search ............................ 345/112; 395/155, 395/156, 157, 158, 159, 160, 161

[56] References Cited

U.S. PATENT DOCUMENTS

| | | | |
|---|---|---|---|
| 4,805,134 | 2/1989 | Calo et al. | 395/600 |
| 4,945,476 | 7/1990 | Bodick et al. | 364/413.02 |
| 5,208,910 | 5/1993 | Higgins et al. | 395/156 |
| 5,388,196 | 2/1995 | Pajak et al. | 395/153 |
| 5,410,692 | 4/1995 | Torres | 395/600 |
| 5,475,768 | 12/1995 | Diep et al. | 382/156 |

FOREIGN PATENT DOCUMENTS 0583207  2/1994  European Pat. Off. ........ G06F 3/033

OTHER PUBLICATIONS

IBM Technical Disclosure Bulletin, V37, No. 2B, Feb. 1994 New York, pp. 257–258, "Method of Automatic Search & Scroll in Multiple Desktop Objects".
IBM Technical Disclosure Bulletin, V37, No. 4A, Apr. 1994 New York, pp. 195–196, "Method of Retrieving Previously Managed Documents by Content Search Criteria" European Search Report, App. No. EP95112254, A. Bailas, Dec. 11, 1995, The Hague.

*Primary Examiner*—Mark R. Powell
*Assistant Examiner*—Ruay Lian Ho
*Attorney, Agent, or Firm*—Edward H. Duffield

[57] ABSTRACT

Automatic navigation to a window which contained a user specified search criteria at some time in history. A user may invoke a number of application programs which display various windows, panels, icons, full screen sessions, and other objects onto a multitasking windowing desktop environment. A service is provided which allows the user to specify a search criteria. The service searches desktop sessions and objects until finding an occurrence that satisfies the criteria in historical data associated with the desktop sessions and objects. Upon finding the occurrence, the service automatically pops the window or full screen session having historical data containing the search string into focus.

20 Claims, 6 Drawing Sheets

METHOD AND APPARATUS FOR PROVIDING CONTEXTUAL NAVIGATION TO HISTORICAL DATA

This is a continuation of application Ser. No. 08/293,361 filed Aug. 19, 1994 now abandoned.

TECHNICAL FIELD OF THE INVENTION

This invention relates in general to data processing systems, and in particular to a method of, and apparatus for, providing automatic navigation in a multitasking windowing environment to a window, which contained a user-specified search criteria at some time in history.

BACKGROUND OF THE INVENTION

Conventional data processing systems may provide capabilities for navigating between multiple windows displayed by a multitasking windowing environment. The window currently selected by a user for display in the foreground and for active input is known as the window with focus. The user may change the focus by use of either an implicit focus model or an explicit focus model.

Where applicable, the term "window" is used throughout this specification in its broadest aspect. This includes a full screen session window or a dimensioned panel window.

In an implicit focus model, such as that provided by the Open Software Foundation, Inc.'s OSF/Motif™ Windowing Environment, the focus is automatically changed to that window upon which the mouse controlled cursor or pointer resides. When the user moves the cursor onto a portion of a window which is partially hidden, the window automatically pops into focus so that the entire window is then visible.

In an explicit focus model, such as that provided by the International Business Machines Corp.'s OS/2™ Presentation Manager windowing environment, the focus is only changed by the user upon an explicit command from the user. If the user wishes to change the focus, then the user moves the pointer onto a portion of a window which is partially hidden, and then the user clicks the mouse to pop the window into focus so that the entire window is then visible. Alternatively, under some explicit focus models, the user may be able to issue explicit commands from a keyboard such as a NEXT WINDOW command or a PREVIOUS WINDOW command. A NEXT WINDOW command changes the focus to a window which first gained focus after the currently displayed window. A PREVIOUS WINDOW command changes the focus to a window which had focus just prior to the currently displayed window. These commands allow the user to navigate through a window queue which is sorted in an order in which the various windows first gained focus.

Note that under both of these focus models, the user may only change the focus based on either the location of a pointer on the display or the location of a window in a window queue (the window queue is often referred to as a system active object table). However, if a user desires to change the focus based on the content of a window, no capability is provided by conventional systems. If the user desires to change the focus to a window containing specific information, then conventional systems fail to change the focus to the desired window. The user must manually change the focus to other windows and visually search these windows to find the window containing the specific information. Application Ser. No. 07/919,436 filed Jul. 27, 1992 by G. Fitzpatrick et al. entitled "Method of and Apparatus for Providing Contextual Navigation" disclosed a method for providing automatic navigation in a multitasking windowing environment to a window containing a user specified search criteria. A user could specify a search criteria and a window containing the criteria at the time of the search would automatically be focused.

If a user desires to change the focus to a window which contained specific information at some time in history, then conventional systems fail to change the focus to the desired window. The user must manually change the focus to other windows and must use human memory to remember which window had contained a sought criteria which is no longer present on the window at the time of the search.

Thus, the prior art provides no method of, or apparatus for, providing automatic navigation in a multitasking windowing environment to a window, which contained a user specified search criteria at some time in history. It is desirable to automatically navigate to a window which contained a search criteria that is no longer present on the window at the time of the search. As such, there is a need for a method of, and apparatus for, providing automatic navigation in a multitasking windowing environment to a window, which contained a user specified search criteria at some time in history.

SUMMARY OF THE INVENTION

The invention disclosed herein comprises a method of, and apparatus for, providing automatic navigation in a multitasking windowing environment to a window, which contained a user specified search criteria at some time in history. The method and apparatus described herein substantially eliminates or reduces the difficulties of attempting to navigate to a window, which contained such search criteria, by providing automatic navigation to a window which contained a user specified search criteria at some time in history.

In accordance with one aspect of the present invention, automatic navigation to a window containing a user specified search criteria is provided. The search criteria may have been present on the window at any time while the window was active. The search criteria does not necessarily have to be present at the time of conducting the search. The window may be partially hidden, fully hidden, or iconized. The window may be a full screen window or a dimensioned panel. A user may invoke a number of application programs which focus panels and other objects onto a desktop. Somewhere in the history of desktop interaction, the user recalls data on a panel which is of interest. Unfortunately, there are so many objects on the desktop, that the panel which contained the interesting data is put out of view by other panels and objects which subsequently are placed onto the desktop. The user must tediously use a mouse or keyboard to rearrange the desktop objects such that the desired panel is put back into view. Furtherstill, the sought window may not currently contain the search criteria. A user is forced to use human memory to recall which window contained the sought criteria.

Another aspect of this invention is that if a search yields multiple objects containing a user specified search criteria, then a user interface is provided to allow selection and focus of the objects yielded by the search.

The present invention has the advantage of allowing a user to locate an application program within a desktop without tedious manual desktop object relocation, trial and error searching and using human memory to recall which object contained particular data.

The present invention has the further advantage of allowing a user to locate an application program within a desktop based on a user specified search criteria.

The present invention has the further advantage of searching objects within a desktop which may have contained sought criteria at some time in history. The objects do not have to contain the criteria at the time of performing the search.

The present invention has the further advantage of allowing an application program, located by a search based on a user specified search criteria, to be popped into focus.

The present invention has the further advantage of allowing an application program within a fully hidden window, located by a search based on a user specified search criteria, to be popped into focus.

The present invention has the further advantage of allowing an application program within a partially hidden window, located by a search based on a user specified search criteria, to be popped into focus.

The present invention has the further advantage of allowing an application program within a minimized or iconized window, located by a search based on a user specified search criteria, to be popped into focus.

The present invention has the further advantage of allowing an application program within a full screen session, located by a search based on a user specified search criteria, to be popped into focus.

BRIEF DESCRIPTION OF DRAWINGS

For a more complete understanding of the present invention and the advantages thereof, reference is now made to the Detailed Description in conjunction with the attached drawings, in which.

DETAILED DESCRIPTION OF THE INVENTION

Figure 1:
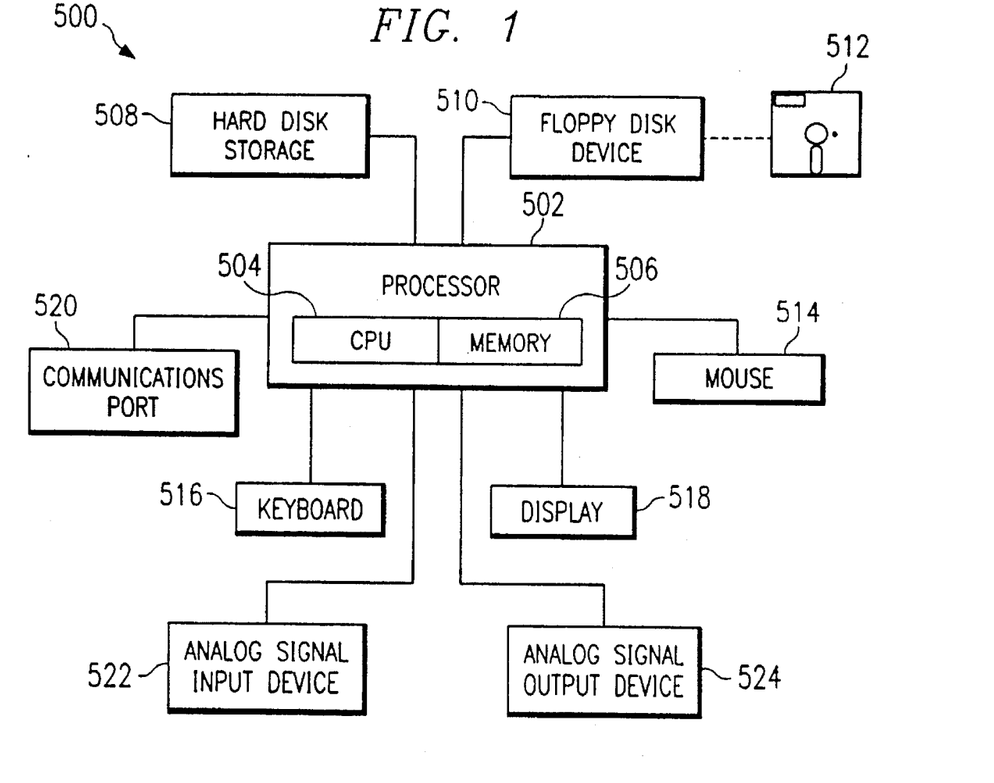
FIG. 1 is a block diagram of a data processing system used in performing the method of the present invention and forming part of the apparatus of the present invention.

Referring first to FIG. 1, there is shown in block diagram form, a data processing system 500 according to the present invention. The data processing system 500 includes a processor 502, which includes a central processing unit (CPU) 504, and a memory 506. Additional memory, in the form of a hard disk file storage 508 and a floppy disk device 510, is connected to the processor 502. Floppy disk device 510 receives a diskette 512 which has computer program code or a data processing system programming implementation recorded thereon that implements the present invention in the data processing system 500. The data processing system 500 may include user interface hardware, including a mouse 514 and a keyboard 516 for allowing user input to the processor 502 and a display 518 for presenting visual data to the user. The data processing system 500 may also include a communications port 520 for communicating with a network or other data processing systems. The data processing system 500 may also include analog signal devices, including an analog signal input device 522 for entering analog signals into the data processing system 500, and an analog signal output device 524 for reproducing analog signals. In the preferred embodiment, data processing system 500 includes an IBM™ PS/2™ personal computer with an operating system such as OS/2™.

Figure 2:
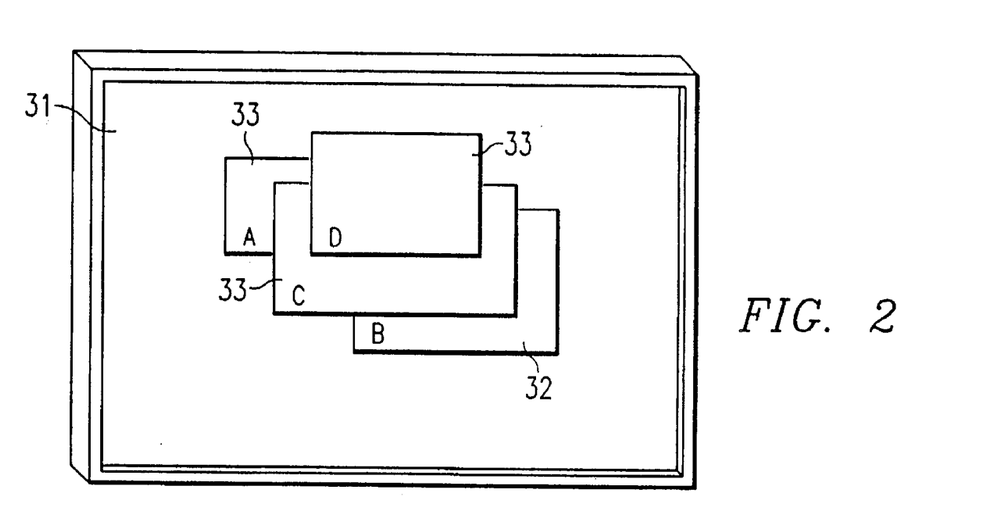
FIG. 2 and FIG. 3 illustrate a hidden window preferred embodiment in accordance with the present invention.
Figure 3:
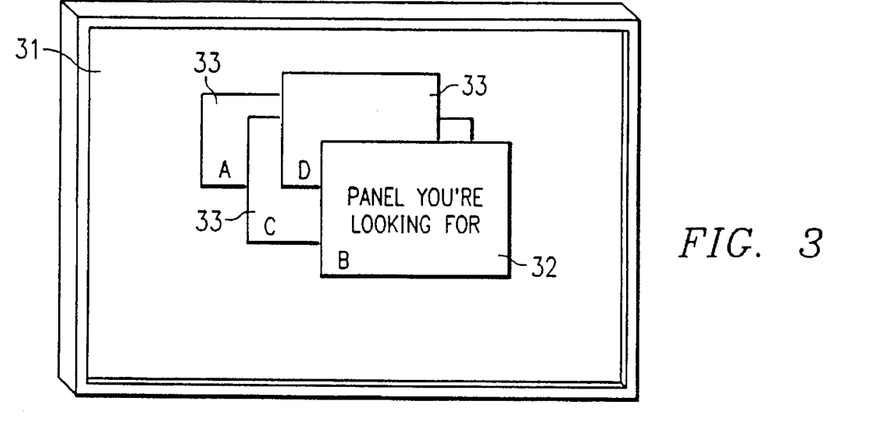

Referring now to FIG. 2, illustrated is a computer display screen desktop 31 where panel B 32 contained interesting textual information at some time in history, but panel B 32 is blocked out of view by other panels 33. The present invention allows the user to specify a search string which is input to a search service for matching the string to the text on panel B 32 and automatically surfacing the panel into focus. FIG. 3 illustrates desktop 31 after the panel B 32 is found by matching the search criteria. This example is particularly demonstrative when panel B 32 is completely out of sight with no easy way for a user to know it exists and no direct way to select it. Further provided is the ability to specify search criteria which is not necessarily present on panel B 32 at the time of conducting the search. Panel B 32, which is automatically focused as shown in FIG. 3, may have contained the sought criteria at any time while the panel was active. The fact that the sought criteria appeared at least once on the panel at some time in history is enough to automatically focus the panel. The sought criteria need not be present at the time of performing the search.

Figure 4:
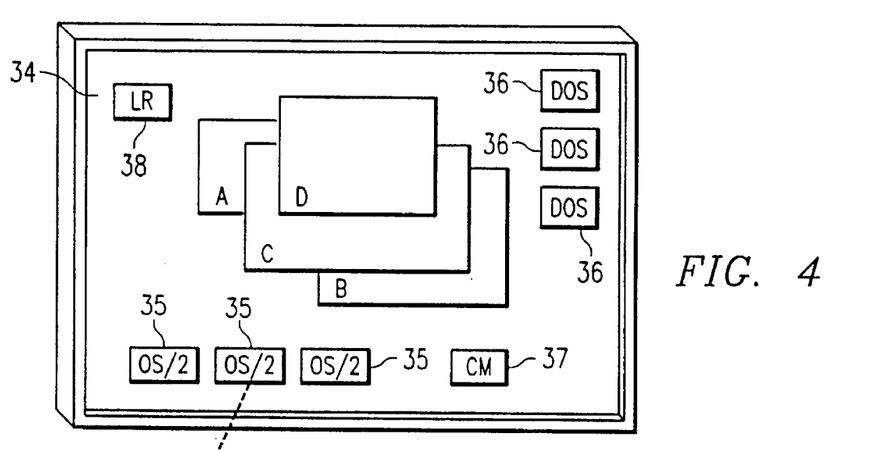
FIG. 4 FIG. 5A and FIG. 5B illustrate an iconized window and a full screen session preferred embodiment in accordance with the present invention.

Another aspect of this invention is automatic navigation to a full screen session containing a user specified search criteria. FIG. 4 illustrates an OS/2 desktop 34 with icons including full screen sessions for OS/2 35, DOS 36, communications manager 37, and LAN Requester 38.

Figure 5A:
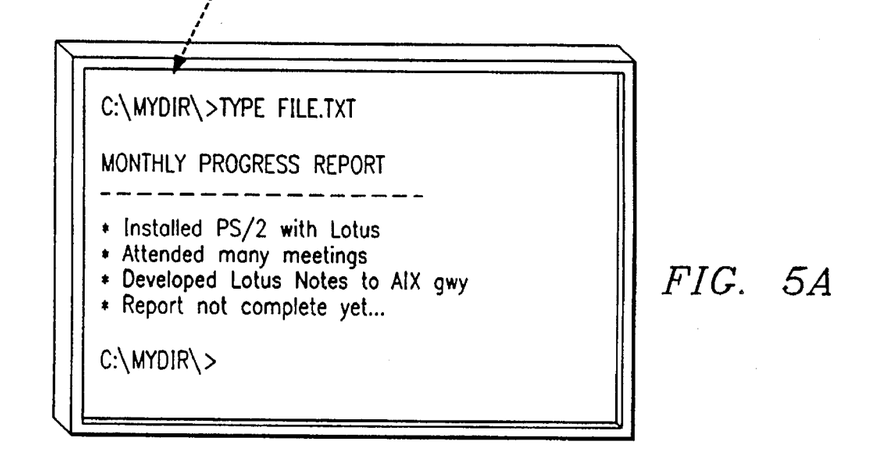
Figure 5B:
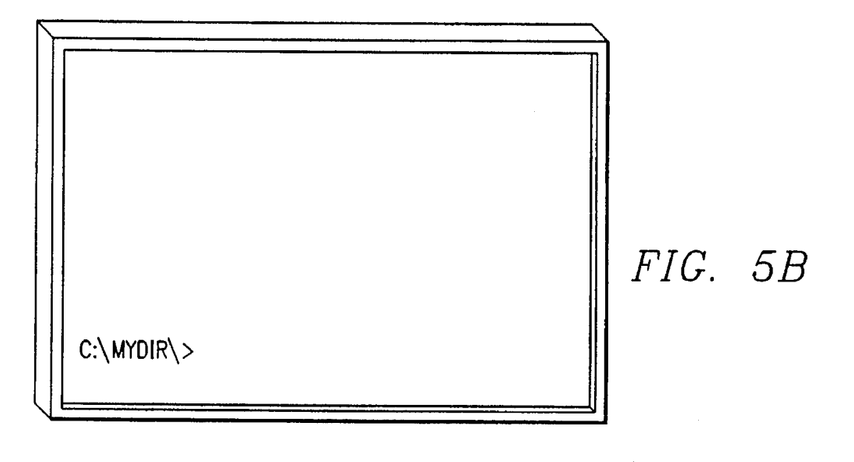

FIG. 4 also shows some panels which are associated with Presentation Manager application programs. Consider what would happen if the user remembered typing out a subordinate's progress report in a full screen but did not remember which full screen it was done in. The user would have to manually select each OS/2 and DOS session, trial and error, to see which session it was typed out in. The present invention allows the user to specify a search criteria such as the string "PROGRESS". The present invention would search desktop sessions and objects until finding the occurrence of the string "PROGRESS". FIG. 5A shows that one of the OS/2 full screen sessions 35 contained the text string and the system automatically transposes to that full screen session. Note that the OS/2 full screen session was iconized prior to transposition. With reference now to FIG. 5B, there is shown a full screen state which appeared sometime after the full screen state illustrated in FIG. 5A. FIG. 5B could also have been produced as the result of the search because "PROGRESS" had appeared some time in history within the full screen session window. It is not important that the criteria is not present at the time of performing the search.

Figure 6:
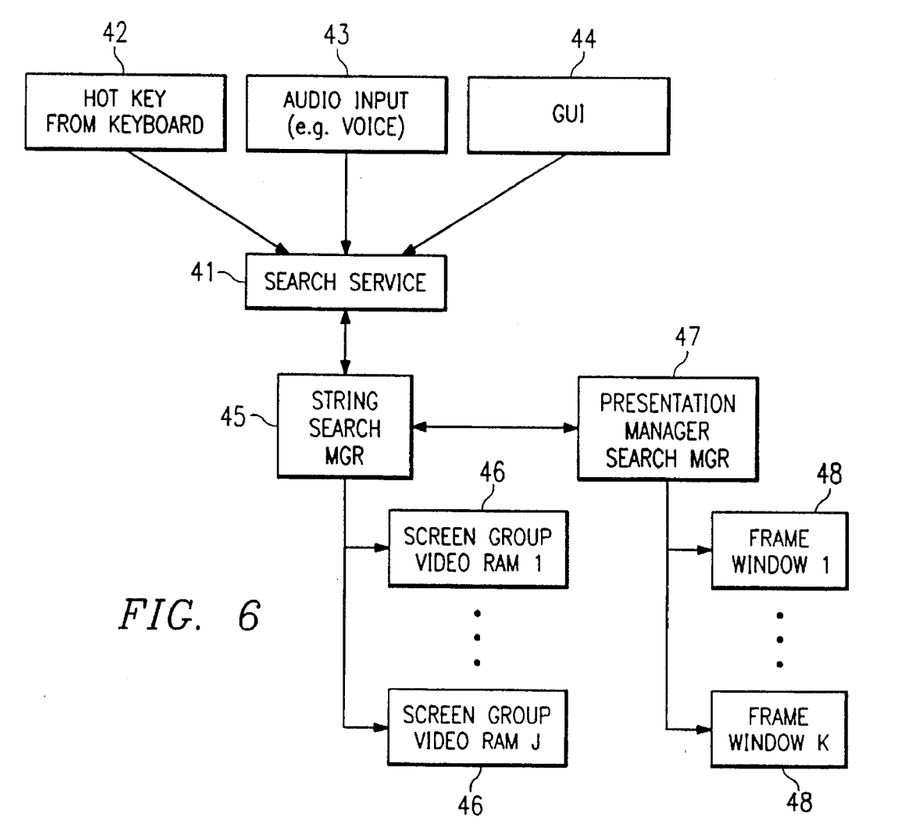
FIG. 6 is a block diagram illustrating a preferred embodiment in accordance with the present invention.

Referring next to FIG. 6, a preferred embodiment of the present invention data processing system programming implementation is illustrated. The system includes a Search Service 41, which is a terminate and stay resident type of program which awaits detection of a command for performing a search. A hot key sequence 42, voice command 43, etc. can be used to activate service 41. Upon detection of a search request, a graphical user interface (GUI) 44 can be presented to the user for entering search criteria (or a voice command itself could enter the data to search for). After search criteria is entered, Search Service 41 invokes a String Search Manager 45 for searching historical data buffers associated with active screen groups 46 on the system. The historical data buffers associated with each active screen group 46 is interrogated for the search criteria. String Search Manager 45 also invokes a Presentation Manager Search Manager 47 for interfacing to the system user interface kernel for searching historical data buffers associated with windows and other objects 48 not covered in system screen groups. Presentation Manager Search Manager 47 is a Presentation Manager interface manager for an OS/2 machine running Presentation Manager, but encompasses any window and icon manager for an arbitrary system. After a list of produced sessions and windows has been produced and communicated from the String Search Manager 45 to the Search Service 41, the Search Service 41 manages user control for transposing to an occurrence in the list and allowing the user to interact for changing to the next session or window satisfying the search in the list. Transposing to an application window, session, etc. occurs exactly as though a mouse or keystroke selection caused the transposition.

Referring now to FIG. 7 through FIG. 12, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Figure 7:
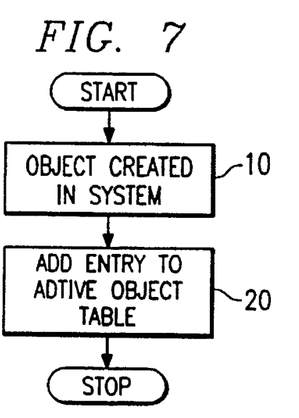
FIG. 7 is a flow chart illustrating the operations preferred in carrying out the user interface object (e.g. window) creation aspect of the present invention.

Referring now to FIG. 7, after the start of the underlying data processing system, block 10 detects the creation of a user interface object. Creation may be the result of automatic data processing system execution or in response to some user selection. Block 10 then proceeds to block 20 where an entry is added to an Active Object Table. The Active Object Table may be inherent with a Presentation Manager or may be separately programmed along with a Presentation Manager. After an entry is added to the table, processing stops. In a multitasking system environment, the FIG. 7 flowchart can execute simultaneously for a multiplicity of created objects. A preferred embodiment of an entry within the Active Object Table is:

OBJECT HANDLE—System handle to particular object

HISTORICAL DATA BUFFER—Pointer to history of data associated with the object

HISTORICAL DATA BUFFER OFFSET—Current offset within history buffer for next data placement The Object Handle is maintained by a Presentation Manager. For example, the handle associated with OS/2 Presentation Manager function calls (e.g. return from WinCreateStdWindow()) is saved into the Active Object Table entry. The Historical Data Buffer contains area for saving and maintaining the history of data associated with a particular window. The Historical Data Buffer may be embodied as a file handle or memory pointer. The size of the Historical Data Buffer is configurable and is assumed to be accommodating to at least one of the largest sized piece of data which may be saved from a user interface object. The preferred embodiment of the present invention manages a wrap technique in the Historical Data Buffer. The Historical Data Buffer Offset always refers to the next available byte in the Historical Data Buffer to start placing data. If data does not fit into the remainder of the Historical Data Buffer, the Historical Data Buffer Offset is set to the first byte in the Historical Data Buffer. This technique ensures the most recent data to a user interface object is saved and the least recent data is overwritten with most recent data.

Figure 8:
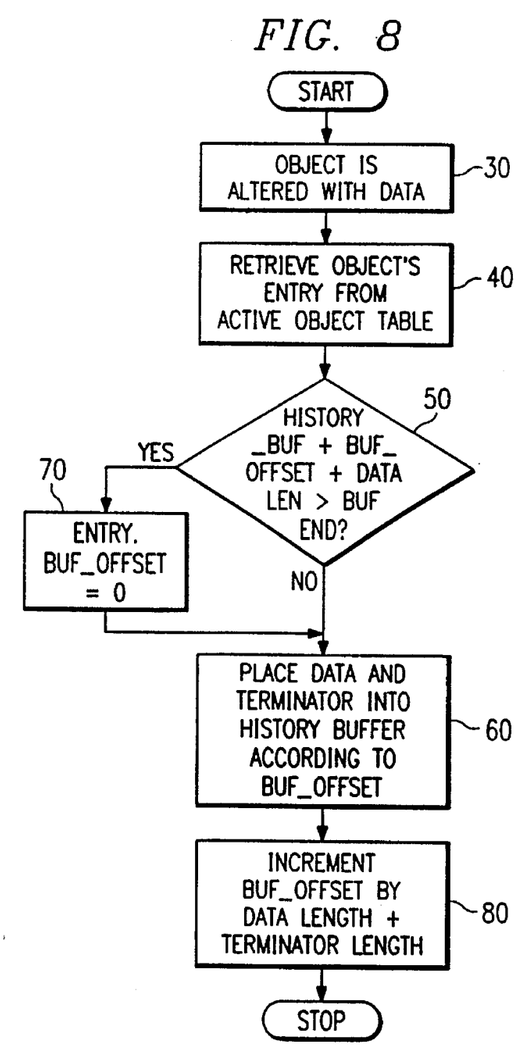
FIG. 8 is a flow chart illustrating the operations preferred in carrying out the historical data collection aspect of the present invention.

Referring now to FIG. 8, after the start of the underlying data processing system, block 30 detects that a user interface object is altered with data. Processing then continues to block 40 where the object's associated Active Object Table entry is retrieved. Block 40 continues to decision block 50 where an assessment is made for whether or not the altered data can fit into the Historical Data Buffer. If there is enough room to place the data in its entirety, processing proceeds to block 60 where the data and a terminator is placed into the Historical Data Buffer, and then on to block 80 where the Active Object Table entry Historical Data Buffer Offset is updated correspondingly. Processing then stops. If in block 50 there was not enough remaining Historical Data Buffer space to store the altered data in its entire, then processing proceeds to block 70 where the Active Object Table entry Historical Data Buffer Offset is set to the first byte in the Historical Data Buffer. Processing then continues to block 60 for processing as previously described. In a multitasking system environment, the FIG. 8 flowchart can execute simultaneously for a multiplicity of altered objects.

It is important to understand the variety of embodiments which may occur for "object is altered with data" at block 30 (also see block 50 and block 60) because the data saved is the data used to satisfy search criteria. The data contained within a particular Historical Data Buffer is the data used to satisfy a search. One preferred embodiment of saving the altered data is saving only the data a user enters into an object. Thus, FIG. 8 would execute upon detection of an enter key sequence or mouse button activation indicating the user has entered data into a window or window field. This means only the user-entered historical data such as commands becomes searchable. Yet another embodiment would detect any data change to a user interface object, and save the data associated with the change for the purpose of searching at a later time.

Figure 9:
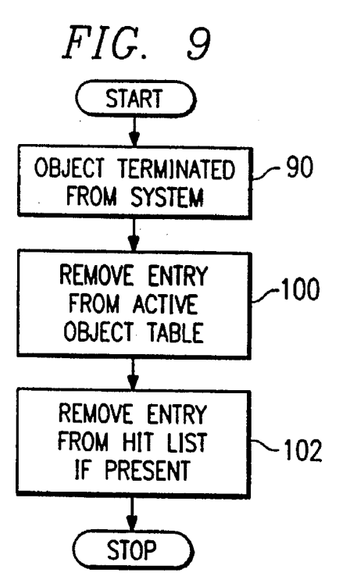
FIG. 9 is a flow chart illustrating the operations preferred in carrying out the user interface object (e.g. window) termination aspect of the present invention.

Referring now to FIG. 9, block 90 detects that a user interface object is terminated from the data processing system. Processing then continues to block 100 where the object's associated Active Object Table entry is deleted. The Historical Data Buffer is appropriately deallocated (or purged for file handle embodiment) prior to performing the delete. Processing continues to block 102 where the same entry or a reference to it is removed from an active Hit List (the Hit List is described in detail in FIG. 10 descriptions which follow). Processing then stops. In a multitasking system environment, the FIG. 9 flowchart can execute simultaneously for a multiplicity of objects. An object is considered active during the time it contains an associated entry in the Active Object Table.

Figure 10:
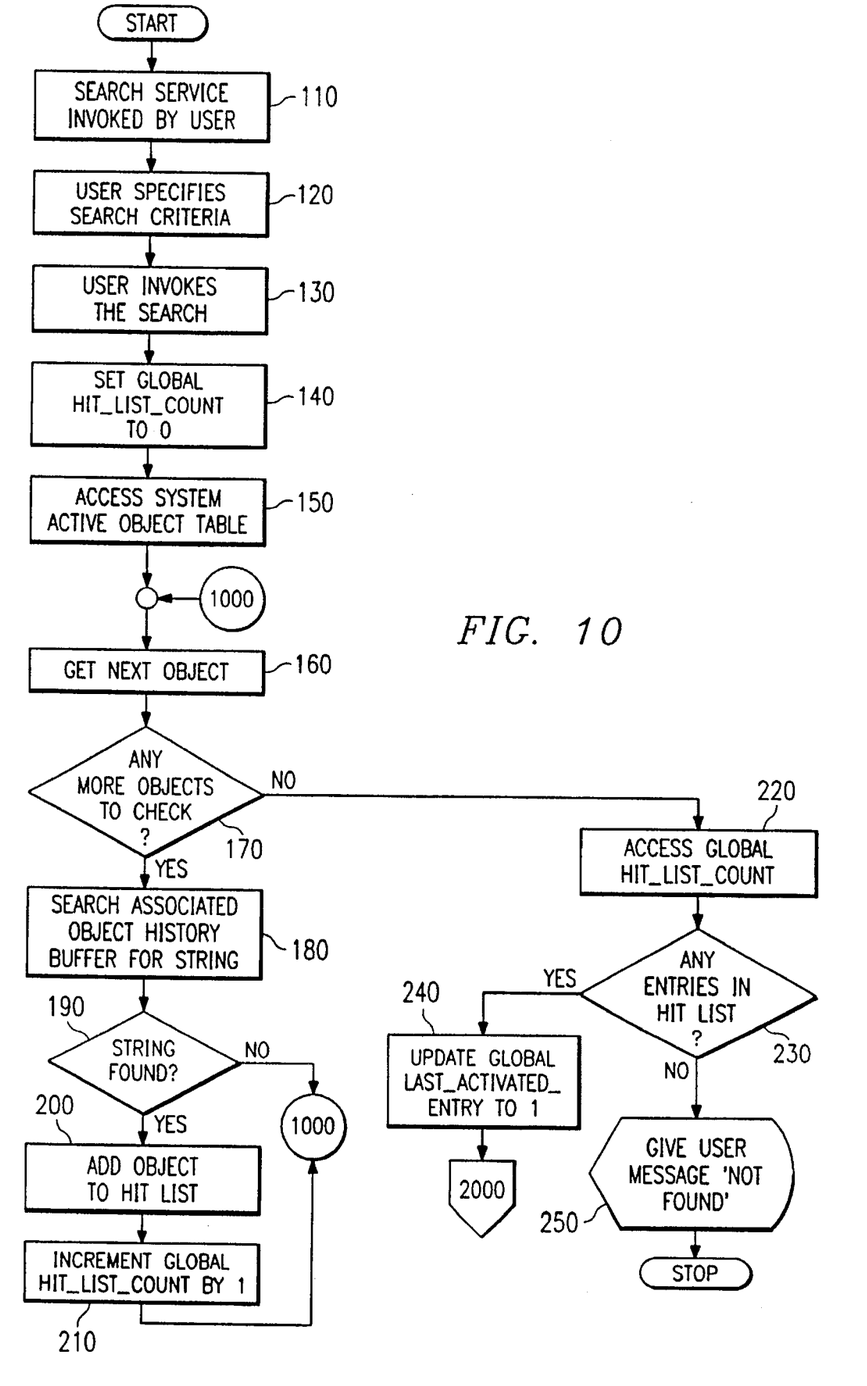
FIG. 10 is a flow chart illustrating the operations preferred in carrying out the search aspects of the present invention.

Referring now to FIG. 10, search processing is described. Block 110 executes as the result of a user requesting to perform a search. Search processing can be requested at any time, particularly in a multitasking data processing system. The user may invoke by pressing a hot key from the keyboard, by selecting a representative icon by use of a mouse, or by another appropriate input invocation such as voice command activation. After invocation by the user, process block 120 allows the user to specify a search criteria. The search criteria is a character string which may be contained in one or more Historical Data Buffers of the objects on the desktop. After the user has successfully entered the search criteria, process block 130 allows the user to invoke a search. A variety of user interface such as keyboard, voice control, mouse activation, or the like, may also be used to enter search criteria. Thereafter, process block 140 sets a global HIT_LIST_COUNT variable equal to zero. The global HIT_LIST_COUNT variable represents the number of objects found to have associated Historical Data Buffers containing the search criteria. Thereafter, process block 150 accesses the Active Object Table. The Active Object Table represents a list of active application program objects which are currently displayed on the desktop. For example, in OS/2 Presentation Manager, the Active Desktop Table corresponds to a windowing system object list produced by using the WinBeginEnumWindows and WinGetNextWindow commands. Thereafter, process block 160 gets the next object stored in the Active Object Table. During its first execution, process block 160 gets the first object stored in the Active Object Table. Thereafter, decision block 170 determines if there are any more objects to search from the Active Object Table. If there are more objects to search from the Active Object Table, then block 180 searches the associated Historical Data Buffer for presence of the search criteria. Process block 180 uses a character string comparison if the current terminated data portion in the Historical Data Buffer contains character data. Process block 180 uses optical character recognition in combination with the character string comparison if the current terminated data portion in the Historical Data Buffer contains pixel image data. If in decision block 190 the criteria is found, then the object is added to a Hit List in block 200. Thereafter, block 210 increments the global HIT_LIST_COUNT variable to reflect the match and processing continues back to block 160 for processing as previously described. The flowchart connectors 1000 indicate processing flow from block 210 (or block 190) to block 160. The Hit List contains all candidates found to have a Historical Data Buffer containing the search criteria. The Hit List may be a list of entries identical to the Active Object Table. A preferred embodiment of the present invention Hit List may be a list of references such as pointers or enumerations which refer to the actual entries in the Active Object Table, thereby preventing duplication of the same data in more than one place. If in block 190 no search criteria match is found, then processing continues directly back to block 160 for processing as previously described. Referring back to decision block 170, if there are no more objects for which to detect search criteria, then processing continues to block 220. Block 160, block 170, block 180, block 190, block 200 and block 210 define an iterative processing loop which processes each active object from the Active Object Table. The loop ends upon flow from decision block 170 to block 220. Block 220 accesses the global HIT_LIST_COUNT variable. Thereafter, block 230 compares it to zero, thereby determining if any matches were found. If one or more matches were found (i.e. HIT_LIST_COUNT>0), then processing continues to block 240 where the global LAST_ACTIVATED_ENTRY variable is initialized to the first hit (i.e. encounter) in the Hit List. Processing then flows to block 300 of the flowchart in FIG. 11 as indicated by flowchart connectors 2000 in FIG. 10 and FIG. 11. Referring back to block 230, if there were no matches found (i.e. HIT_LIST_COUNT equals 0), then processing flows to block 250 where the user is notified with a NOT FOUND message. Thereafter, processing stops and the user is free to conduct another search.

Figure 11:
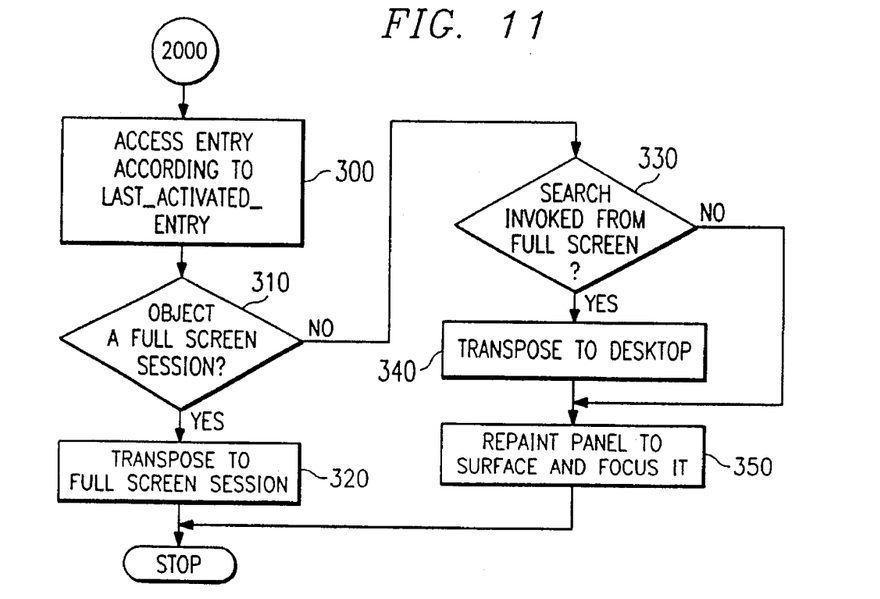
FIG. 11 is a flow chart, continued from FIG. 10, illustrating the operations preferred in carrying out the automatic focusing aspect of the present invention.

Block 240 flows to FIG. 11 block 300 as previously described. Referring now to FIG. 11, block 300 accesses the global LAST_ACTIVATED_ENTRY variable to determine which object in the Hit List to automatically bring to focus (for example, if the LAST_ACTIVATED_ENTRY is equal to one, then process block 300 accesses the first object in the Hit List), and thereafter decision block 310 determines what type of object must be focused. If in decision block 310 the object obtained in block 300 is a full screen session, then block 310 proceeds to block 320 which transposes the user to the full screen session and processing stops. If in decision block 310 the object is a panel (i.e. not a full screen session), then processing flows to decision block 330. If in block 330, the search was invoked by the user from a full screen session then processing flows to block 340 which transposes the user to the desktop. Block 340 then proceeds to block 350 where the appropriate panel is brought to focus and processing stops. Referring now back to decision block 330, if the search was invoked from the desktop (i.e. not a full screen session), then block 330 flows to block 350 which brings the appropriate panel to focus as previously described. Block 350 then stops processing. It should be noted that FIG. 11 focuses the correct object in the Hit List according to the current setting of the global LAST_ACTIVATED_ENTRY variable. This allows FIG. 11 to process independently according to the global LAST_ACTIVATED_ENTRY variable.

Figure 12:
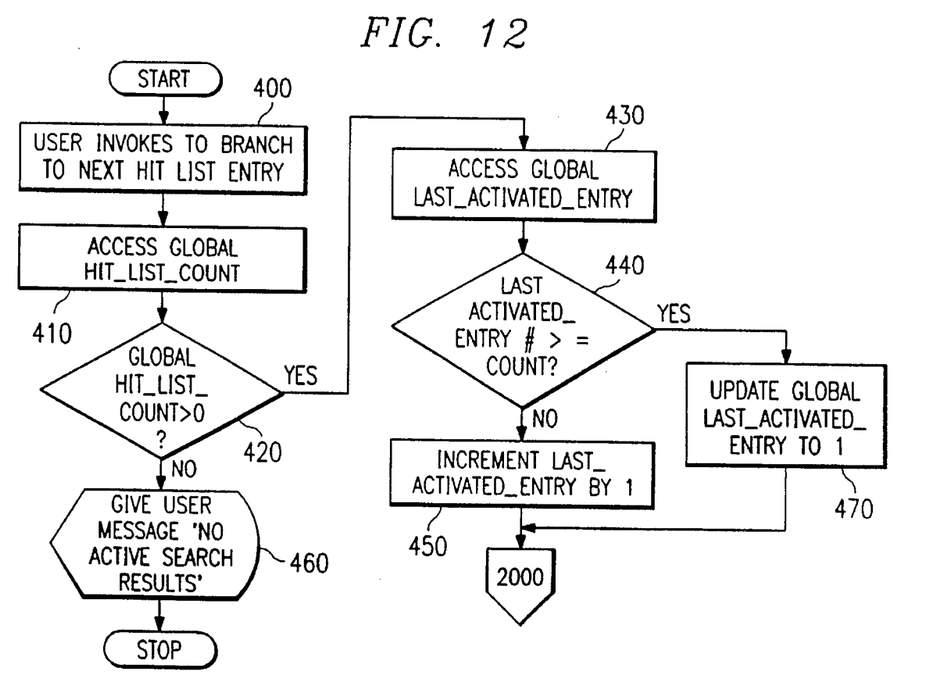
FIG. 12 is a flow chart illustrating the operations preferred in carrying out the multiple search result list management aspect of the present invention.

With reference now to FIG. 12 and referring to process block 400, process block 400 illustrates a second user invoked entry point for the present invention. In addition to providing a first user invoked entry point upon a user invoking a search as illustrated by process block 110 of FIG. 10, the program also provides a second user invoked entry point upon a user invoking the program to display the next object in the Hit List. After the start of the program, process block 400 awaits invocation by a user. The user may invoke by pressing a second hot key from the keyboard, by selecting a second representative icon by use of a mouse, or by another second appropriate input invocation. After invocation by the user, process block 410 accesses the global HIT_LIST_COUNT variable. Thereafter, decision block 420 determines if the global HIT_LIST_COUNT variable is greater than zero. If the global HIT_LIST_COUNT variable is not greater than zero, then process block 460 gives a message to the user that there are no active search results. This message is provided when there are no objects contained in the Hit List and the user requests to display the next object contained in the Hit List. Thereafter, the program stops. Returning now to decision block 420, if the global HIT_LIST_COUNT variable is greater than zero, then process block 430 accesses the global LAST_ACTIVATED_ENTRY variable. Thereafter, decision block 430 determines if the global LAST_ACTIVATED_ENTRY variable is equal to the global HIT_LIST_COUNT variable. If the global LAST_ACTIVATED_ENTRY variable is not equal to the global HIT_LIST_COUNT variable, then process block 450 increments the global LAST_ACTIVATED_ENTRY variable by one. Thereafter, the program continues to process block 300 of FIG. 11 to display the next object in the Hit List. This processing path is illustrated by flowchart connectors 2000 on FIG. 12 and FIG. 11. Returning now to decision block 440, if the global LAST_ACTIVATED_ENTRY variable is equal to the global HIT_LIST_COUNT variable, then process block 470 sets the global LAST_ACTIVATED_ENTRY variable equal to one. This handles the situation where the last object displayed is also the last object in the Hit List, and the program must wrap around to the first object in the Hit List to display the next object. Thereafter, the program continues to process block 300 to display the next object in the Hit List. This processing path is illustrated by flowchart connectors 2000 on FIG. 12 and FIG. 11.

Those skilled in the art will appreciate that exclusive access to the Active Object Table and Hit List must be appropriately implemented within asynchronous threads of execution demonstrated by FIG. 7, FIG. 8, FIG. 9, FIG. 10 and FIG. 12. Semaphore control is preferably utilized to ensure at most one thread of execution is accessing the Active Object Table or Hit List at any particular time. An access exclusivity path is achieved through units of work at strategic code points. For example, FIG. 7 block 20 is a unit of work against the Active Object Table resource. FIG. 8 block 40, block 50, block 60, block 70 and block 80 is a unit of work against the Active Object Table. FIG. 9 block 100 and block 102 is a unit of work against the Active Object Table and the Hit List. Those skilled in the art will recognize similar places in FIG. 10 and FIG. 12.

Although the present invention has been particularly shown and described with reference to a preferred embodiment, it will be understood by those skilled in the art that various changes in form and detail may be made without departing from the spirit and the scope of the invention.

What is claimed is:

1. A method of providing navigation in a multitasking windowing environment to display a window of an active object that contains data matching a specific, previously displayed user-specified search criteria, said method comprising the computer implemented steps of:

forming a buffer holding historical data of previously displayed windows for for each active object in said multitasking windowing environment;

storing sequential in said historical data buffer for an active object, the data displayed in each said window of said active object as said data is displayed;

in response to entry of a search string, searching each said historical data buffer for data matching said search string; and, providing focus to said specific, previously displayed window in an active object having a historical data buffer entry that matches said search string.

2. The method of claim 1, wherein the active object is a full screen session.

3. The method of claim 1, wherein the active object is a hidden window.

4. The method of claim 1, wherein the active object is an iconized window.

5. The method of claim 1, wherein the historical data is data entered by the user into the active object.

6. The method as claimed in claim 1, wherein said step of providing focus includes the steps of:

forming a hit list of active objects that contain said search string; and, displaying said hit list.

7. The method as claimed in claim 6, wherein said providing focus step includes the further step of:

displaying a window containing said search string in response to selection of an item from said displayed hit list.

8. The method as claimed in claim 1, including the steps of:

deleting the historical data buffer for each active object that is terminated in said windowing environment.

9. The method as claimed in claim 1, wherein said data stored in said historical data buffer is data entered into a window by a user.

10. The method as claimed in claim 1, including the steps of:

performing optical character recognition non-character mode information in a window; and, storing results of said optical character recognition in the historical data buffer for said window.

11. A system for providing navigation in a multitasking windowing environment to a window of an active object that contained a user specified search criteria at some time, said system comprising:

historical data buffer for each active object in said multitasking windowing environment;

means for storing in the historical data buffer for an active object the data displayed in each window of said active object as said data is displayed;

means responsive to entry of a search string for searching each historical data buffer for said search string; and, means for providing focus to a window in an active object having a historical data buffer that contains said search string.

12. The apparatus of claim 11, wherein the active object is a full screen session.

13. The apparatus of claim 11, wherein the active object is a hidden window.

14. The apparatus of claim 11, wherein the active object is an iconized window.

15. The apparatus of claim 11, wherein the historical data is data entered by the user into the active object.

16. The system as claimed in claim 11, wherein said means for providing focus includes:

means for forming a hit list of active objects that contain said search string; and, means for displaying said hit list.

17. The system as claimed in claim 16, wherein said means for providing focus further includes:

means for displaying a window containing said search string in response to selection of an item from said displayed hit list.

18. The system as claimed in claim 11, including:

means for deleting the historical data buffer for each active object that is terminated in said windowing environment.

19. The system as claimed in claim 11, wherein said data stored in said historical data buffer is data entered into a window by a user.

20. The system as claimed in claim 11, including:

means for performing optical character recognition non-character mode information in a window; and, means for storing results of said optical character recognition in the historical data buffer for said window.

* * * * *